US012260970B2

(12) United States Patent
Yasuyoshi et al.

(10) Patent No.: US 12,260,970 B2
(45) Date of Patent: Mar. 25, 2025

(54) COMMUNICATION CABLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Yasuyoshi, Mie (JP); Tatsuya Shimada, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 93 days.

(21) Appl. No.: 18/269,212

(22) PCT Filed: Dec. 22, 2021

(86) PCT No.: PCT/JP2021/047520
§ 371 (c)(1),
(2) Date: Jun. 22, 2023

(87) PCT Pub. No.: WO2022/138704
PCT Pub. Date: Jun. 30, 2022

(65) Prior Publication Data

US 2024/0047101 A1 Feb. 8, 2024

(30) Foreign Application Priority Data

Dec. 24, 2020 (JP) ................................ 2020-214860

(51) Int. Cl.
*H01B 11/00* (2006.01)
*H01B 7/29* (2006.01)
*H01B 11/18* (2006.01)

(52) U.S. Cl.
CPC ......... *H01B 11/1869* (2013.01); *H01B 7/292* (2013.01); *H01B 11/1813* (2013.01);
(Continued)

(58) Field of Classification Search
CPC ................ H01B 11/1869; H01B 7/292; H01B 11/1813; H01B 11/1817; H01B 11/1878; H01B 11/1895
See application file for complete search history.

(56) References Cited

U.S. PATENT DOCUMENTS

| | | | | |
|---|---|---|---|---|
| 5,434,354 A * | 7/1995 | Baker | H01B 11/1091 | 174/115 |
| 6,384,337 B1 * | 5/2002 | Drum | H01B 11/1813 | 174/102 R |
| 2021/0225559 A1 * | 7/2021 | Simpson | H01B 11/1808 | |

FOREIGN PATENT DOCUMENTS

| | | |
|---|---|---|
| JP | H03-088214 A | 4/1991 |
| JP | H11-053956 A | 2/1999 |
| JP | 2016-197509 A | 11/2016 |

OTHER PUBLICATIONS

International Search Report issued on Mar. 8, 2022 for WO 2022/138704 A1 (4 pages).

* cited by examiner

*Primary Examiner* — Pete T Lee
(74) *Attorney, Agent, or Firm* — Venjuris, P.C.

(57) ABSTRACT

A communication cable 1 is provided with a conductor 2, an insulation layer 3 containing an organic polymer and covering an outer periphery of the conductor 2, a metal foil 5 for covering an outer periphery of the insulation layer 3, and a
(Continued)

magnetic sheath layer 7 containing an organic polymer and a powdered magnetic material and covering an outer periphery of the metal foil 5. A tensile modulus of elasticity of the magnetic sheath layer 7 is lower than that of the insulation layer 3. Assuming that an organic polymer having a melting point of 100° C. or lower is a low melting point polymer and a mass ratio of the low melting point polymer to organic polymer components constituting each layer is a low melting point component ratio, the low melting point component ratio is larger in the magnetic sheath layer 7 than in the insulation layer 3.

10 Claims, 2 Drawing Sheets

(52) U.S. Cl.
CPC ..... *H01B 11/1817* (2013.01); *H01B 11/1878* (2013.01); *H01B 11/1895* (2013.01)

COMMUNICATION CABLE

CROSS REFERENCE TO RELATED APPLICATIONS

This application is a national phase of PCT application No. PCT/JP2021/047520, filed on 22 Dec. 2021, which claims priority from Japanese patent application No. 2020-214860, filed on 24 Dec. 2020, all of which are incorporated herein by reference.

TECHNICAL FIELD

The present disclosure relates to a communication cable.

BACKGROUND

In a coaxial cable used as a communication cable, a metal foil or metal braided layer provided as an external conductor on the outer periphery of a signal wire functions as a noise shield for reducing noise intrusion from outside and noise emission to outside. However, since a communication signal is easily affected by the interference of external electromagnetic waves in the coaxial cable, the influence of noise may be insufficiently reduced only by providing the metal foil or metal braided layer on the outer periphery of the signal wire. Accordingly, in terms of further reducing the influence of external electromagnetic waves on the communication signal, a member containing a magnetic material such as the one called a ferrite core may be mounted on the outer periphery of the coaxial cable. Alternatively, as disclosed in Patent Document 1, 2 and the like, a communication cable may be configured by providing a shield body made of a metal material such as a metal foil or metal braided wire and further providing a sheath layer containing a magnetic material outside the shield body.

PRIOR ART DOCUMENT

Patent Document

Patent Document 1: JP 2016-197509 A
Patent Document 2: JP H03-088214 A

SUMMARY OF THE INVENTION

Problems to be Solved

If a member such as a ferrite core is arranged in an outer peripheral part for the purpose of reducing interference with external electromagnetic waves in the coaxial cable used as a communication cable, a mass increase and an increase of a space required to route the communication cable become remarkable. In a field in which the weight saving and space saving of wires to be used are important such as in the field of automotive vehicles or the like, it is not realistic to mount a member such a ferrite core as a measure against electromagnetic waves to a communication cable.

On the other hand, if a shield layer containing a magnetic material is integrally provided on the outer periphery of a coaxial cable as disclosed in Patent Document 1 and 2, weight saving and space saving are more easily enhanced than in the case of using a ferrite core. However, the sheath layer containing the magnetic material of this type tends to be low in flexibility due to the content of a large amount of the magnetic material for sufficient shielding of electromagnetic waves. If the coaxial cable including the sheath layer with low flexibility continues to be used in an environment frequently susceptible to bending and vibration such as the inside of an automotive vehicle, there is a possibility that a large load is applied to the metal foil inside.

FIG. 3 shows a bent state of a conventionally general coaxial communication cable 1' along an axial direction. Here, only a region corresponding to the outside of the bending from a central part of a conductor 2 is shown. The communication cable 1' includes a metal foil 5 and a braided layer 6 in this order outside a core wire 4 having an insulation layer 3 provided on the outer periphery of the core 2, and further includes a magnetic sheath layer 7 containing a magnetic material on the outer periphery of the braided layer 6. The metal foil 5 and the braided layer 6 follow the bending of the core wire 4 when the communication cable 1' is bent, but the magnetic sheath layer 7 cannot follow the bending of the core wire 4 since being low in flexible and hard to bend. Thus, as indicated by an ellipse in FIG. 3, the bent braided layer 6 is in contact with the inner peripheral surface of the magnetic sheath layer 7 at a contact part A' having a small area. Then, in the contact part A' having a small area, the metal foil 5 is sandwiched between the braided layer 6 and the core wire 4 and a large load, accompanied by pressure and friction, is applied to the metal foil 5. As just described, by arranging the magnetic sheath layer 7, which hardly follows the bending, on the outer periphery of the metal foil 5, a large load is applied to the metal foil 5 sandwiched between the core wire 4 and the magnetic sheath layer 7 when the communication cable 1' is bent. If the braided layer 6 is provided, the application of that load is particularly serious. As a result, damage such as breakage or crack easily occurs in the metal foil 5. The damage of the metal foil 5 leads to a reduction in the noise shielding performance of the communication cable 1'.

It is important in maintaining the noise shielding performance in the coaxial communication cable also in an environment susceptible to bending and vibration to avoid the damage of the metal foil due to the presence of the magnetic sheath layer with low flexibility. Further, if the communication cable is used in an environment easy to reach a high temperature such as the inside of an automotive vehicle, it is desired to be able to maintain high noise shielding performance by similarly avoiding the damage of the metal foil due to the present of the magnetic sheath layer even if the communication cable is placed in a high-temperature environment.

In view of the above, it is aimed to provide a communication cable hardly susceptible to the damage of a metal foil during bending due to the influence of a sheath layer containing a magnetic material and provided on the outer periphery of the metal foil.

Means to Solve the Problem

The present disclosure is directed to a communication cable with a conductor, an insulation layer containing an organic polymer, the insulation layer covering an outer periphery of the conductor, a metal foil for covering an outer periphery of the insulation layer, and a magnetic sheath layer containing an organic polymer and a powdered magnetic material, the magnetic sheath layer covering an outer periphery of the metal foil, a tensile modulus of elasticity of the magnetic sheath layer being lower than that of the insulation layer, and assuming that an organic polymer having a melting point of 100° C. or lower is a low melting point polymer and a mass ratio of the low melting point polymer to organic polymer components constituting each layer is a low melting point component ratio, the low melting point component ratio being larger in the magnetic sheath layer than in the insulation layer.

Effect of the Invention

The communication cable according to the present disclosure is hardly susceptible to the damage of the metal foil during bending due to the influence of the sheath layer containing the magnetic material and provided on the outer periphery of the metal foil.

DETAILED DESCRIPTION TO EXECUTE THE INVENTION

Description of Embodiments of Present Disclosure

Figure 1:
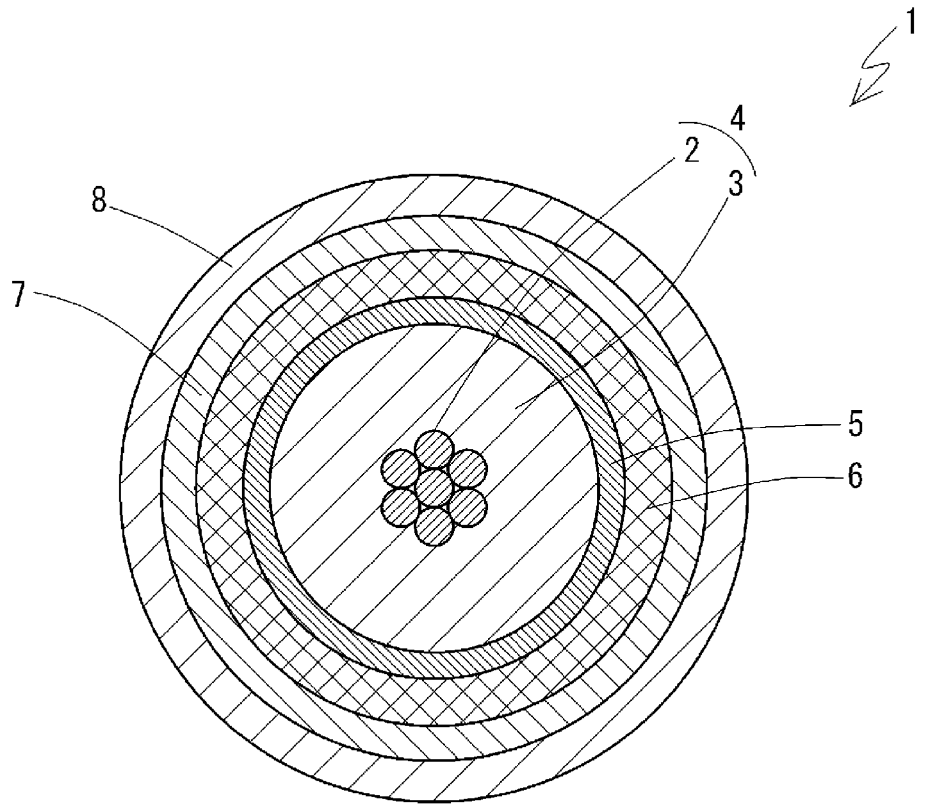
FIG. 1 is a section perpendicular to an axial direction showing the configuration of a communication cable according to one embodiment of the present disclosure.

First, embodiments of the present disclosure are listed and described.

The communication cable according to the present disclosure is provided with a conductor, an insulation layer containing an organic polymer, the insulation layer covering an outer periphery of the conductor, a metal foil for covering an outer periphery of the insulation layer, and a magnetic sheath layer containing an organic polymer and a powdered magnetic material, the magnetic sheath layer covering an outer periphery of the metal foil, a tensile modulus of elasticity of the magnetic sheath layer being lower than that of the insulation layer, and assuming that an organic polymer having a melting point of 100° C. or lower is a low melting point polymer and a mass ratio of the low melting point polymer to organic polymer components constituting each layer is a low melting point component ratio, the low melting point component ratio being larger in the magnetic sheath layer than in the insulation layer.

In the communication cable, the magnetic sheath layer provided outside the metal foil has a lower tensile modulus of elasticity than the insulation layer inside the metal foil. That is, the magnetic sheath layer has high flexibility. Thus, when the communication cable is bent, the magnetic sheath layer follows the bending of the communication cable well and a contact state with the magnetic sheath layer or a member such as a braided layer arbitrarily provided inside the magnetic sheath layer is maintained in a large area. As a result, a large load from the magnetic sheath layer is less likely to be concentrated on and applied to a specific part of the metal foil, and the metal foil is less likely to be damaged even after bending. Further, in the communication cable, the low melting point component ratio is larger in the magnetic sheath layer than in the insulation layer. That is, the magnetic sheath layer contains more low melting point polymer having a melting point of 100° C. or lower than the insulation layer. Thus, when the communication cable is exposed to a high temperature, the magnetic sheath layer starts to be softened from a lower temperature than the insulation layer. As a result, if a high temperature is reached, the state where the magnetic sheath layer has higher flexibility than the insulation layer is easily maintained and the damage of the metal foil is suppressed due to the magnetic sheath layer following the bending also in a high-temperature environment. Therefore, the communication cable can be suitably used as the one for maintaining high electromagnetic shielding performance also in an environment where vibration and bending are applied and a high temperature is reached such as the inside of an automotive vehicle.

Here, the communication cable may further include a braided layer constituted as a braided body by braiding metal strands, the braided layer covering the outer periphery of the metal foil, and the magnetic sheath layer may cover an outer periphery of the braided layer. By providing the braided layer composed of the metal strands on the outer periphery of the metal foil, a load applied to the metal foil when the communication cable is bent tends to increase. However, in the communication cable according to the embodiment of the present disclosure, the magnetic sheath layer follows the bending of the communication cable well and a large contact area between the metal foil and the braided layer is maintained. Thus, a load applied from the magnetic sheath layer to the metal foil via the braided layer is effectively reduced.

Here, a content of the low melting point polymer may be less than that of a high melting point polymer having a melting point exceeding 100° C. in the magnetic sheath layer. Further, the low melting point component ratio may be 15% or more and 45% or less in the magnetic sheath layer and 10% or less in the insulation layer. Then, an effect of enhancing the flexibility of the magnetic sheath layer and suppressing the damage of the metal foil associated with the bending of the communication cable is particularly excellent at normal and high temperatures.

The magnetic sheath layer may contain a copolymer of an ethylene and a polar monomer as the low melting point polymer. Such a copolymer tend to have a low melting point and high flexibility and show a high affinity to the magnetic material. As a result, the flexibility and mechanical strength of the magnetic sheath layer are effectively improved in the magnetic sheath layer.

Flexibility evaluated by a three-point bending test may be higher in the magnetic sheath layer than in the insulation layer at both 23° C. and 150° C. This means that the magnetic sheath layer maintains flexibility equal to or higher than that of the insulation layer from a normal temperature to a high temperature of about 150° C. Thus, when the communication cable is bent in an environment from the normal temperature to the high temperature, the damage of the metal foil can be effectively suppressed by allowing the magnetic sheath layer to follow the bending.

The magnetic sheath layer may contain 200 parts by mass or more and 800 parts by mass or less of the magnetic material based on 100 parts by mass of the organic polymer components. Then, the magnetic sheath layer shows high electromagnetic shielding performance and the flexibility thereof exhibited by the organic polymer components is less likely to be damaged.

The communication cable may further include an outer sheath layer on an outer periphery of the magnetic sheath layer, the outer sheath layer containing an organic polymer and no magnetic material. The outer sheath layer protects the magnetic sheath layer from contact with external objects.

Further, a progress of the damage such as a crack or breakage caused in the magnetic sheath layer can be suppressed by the presence of the outer sheath layer.

In this case, the low melting point component ratio may be larger in the magnetic sheath layer than in the outer sheath layer. Generally, since the magnetic sheath layer contains the magnetic material, the flexibility of the magnetic sheath layer tends to be lower and more easily reduced particularly at high temperature than the outer sheath layer containing no magnetic material. However, since the low melting point component ratio is larger in the magnetic sheath layer than in the outer sheath layer, the magnetic sheath layer can maintain high flexibility from a normal temperature to a high temperature and, when the communication cable is bent, the application of a large load from the magnetic sheath layer to the metal foil can be effectively suppressed.

Further, the magnetic sheath layer may contain an organic polymer adhesive to the outer sheath layer. Then, an effect of suppressing a progress of the damage caused in the magnetic sheath layer is enhanced by the presence of the outer sheath layer.

Details of Embodiment of Present Disclosure

Hereinafter, a communication cable according to one embodiment of the present disclosure is described in detail using the drawings. Various characteristics are values measured at normal temperature (roughly 23° C.) unless otherwise specified.

(Overall Configuration of Communication Cable)

FIG. 1 shows a section perpendicular to an axial direction of a communication cable 1 according to one embodiment of the present disclosure. The communication cable 1 is configured as a coaxial cable and suitably used to transmit, for example, a signal in a high frequency region equal to or higher than 1 GHz.

The communication cable 1 includes a core wire 4 having a conductor 2 and an insulation layer 3 covering the outer periphery of the conductor 2. A metal foil 5 and a braided layer 6 configured as a braided body by braiding metal strands are provided as a metal shield layer on the outer periphery of the core wire 4. The metal foil 5 covers the outer periphery of the core wire 4 and the braided layer 6 is further provided to cover the outer periphery of the metal foil 5. A magnetic sheath layer 7 containing a magnetic material is provided on the outer periphery of the braided layer 6. Further, an outer sheath layer 8 containing no magnetic material is arbitrarily further provided on the outer periphery of the magnetic sheath layer 7.

In the communication cable 1 according to this embodiment, the magnetic sheath layer 7 and the insulation layer 3 both formed as layers containing an organic polymer preferably satisfy the following relationships 1 and 2 and further a relationship 3 in tensile modulus of elasticity and component composition.

Relationship 1: The tensile modulus of elasticity of the magnetic sheath layer 7 is lower than that of the insulation layer 3.

Relationship 2: A low melting point component ratio is larger in the magnetic sheath layer 7 than in the insulation layer 3.

Relationship 3: Flexibility evaluated by a three-point bending test is higher in the magnetic sheath layer 7 than in the insulation layer 3 at both 23° C. and 150° C.

Here, the tensile modulus of elasticity can be evaluated by a tensile test based on JIS K 7161. Further, organic polymers having a melting point of 100° C. or lower are low melting point polymers, and a mass ratio of the low melting point polymer, out of organic polymer components constituting each layer (each of the insulation layer 3 and the magnetic sheath layer 7) is the low melting point component ratio. In other words, a numerical value when a content of the low melting point polymer is indicated in parts by mass based on 100 parts by mass of the total organic polymer components constituting each layer is the low melting point component ratio indicated in percent. The three-point bending test is a test for measuring a maximum bending stress when a central part is bent with both ends in a length direction of a sample supported as a three-point bending force by a bending characteristic test based on JIS K 7171. It is indicated that the smaller the obtained value of the three-point bending force, the higher the flexibility. A value measured for a piece cut out from a target layer and having a length of 80 mm is indicated as the three-point bending force (unit: N) below.

As described in detail later, since the magnetic sheath layer 7 and the insulation layer 3 satisfy the relationships 1 and 2 and further preferably the relationship 3, a damage due to the presence of the magnetic sheath layer 7 is less likely to occur in the metal foil 5 when the communication cable 1 is bent in normal-temperature and high-temperature environments. Each constituent member of the communication cable 1 is described in detail below.

(Conductor)

The conductor 2 is responsible for transmitting an electrical signal. Various metal materials can be used as a material constituting the conductor 2, but copper alloy is preferably used in terms of having high electrical conductivity. The conductor 2 may be constituted as a single wire, but is preferably constituted as a stranded wire obtained by twisting a plurality of strands (e.g., seven strands) in terms of enhancing flexibility during bending and the like. In this case, after the strands are twisted, compression molding is performed to obtain a compressed stranded wire. If the conductor 2 is constituted as a stranded wire, the conductor 2 may be composed of all the same strands or may include two or more types of strands. A diameter of the conductor 2 is not particularly limited. A range of 0.05 $mm^2$ or more and 1.0 $mm^2$ or less can be illustrated as a range of a conductor cross-sectional area.

(Insulation Layer)

The insulation layer 3 insulates the conductor 2 in the core wire 4 and contains an insulating organic polymer. As long as the insulation layer 3 and the magnetic sheath layer 7 satisfy the above relationships 1 and 2, the type of the organic polymer is not particularly limited, but olefin-based polymers such as polyolefins and olefin-based copolymers, halogen-based polymers such as polyvinyl chloride, various engineering plastics, elastomers, rubbers and the like can be cited. One type of organic polymer may be used or two or more types of organic polymers may be used in combination through mixing, lamination or the like. The organic polymer may be cross-linked or foamed.

In terms of enhancing communication characteristics, it is preferable to use a low molecular polar organic polymer, out of those listed above, as the organic polymer for constituting the insulation layer 3. For example, non-polar organic polymers such as polyolefins including polypropylene (PP) is preferably used. A homopolyolefin such as homo PP or a block polyolefin such as block PP may be used as the polyolefin. The insulation layer 3 may contain a polar organic polymer such as a modified polyolefin, but a content thereof is preferably 10% or less, further 5% or less in a mass ratio to the total organic polymer components.

As specified by the relationships 1 and 2, the insulation layer 3 has a high tensile modulus of elasticity in comparison to the magnetic sheath layer 7 and contains only a small amount of the low melting point polymer. In terms of those, the low melting point component ratio in the insulation layer 3, i.e. a ratio of the low melting point polymer having a melting point of 100° C. or lower is preferably 10% or less, further 5% or less, and the polymer components other than the small amount of the low melting point polymer may be high melting point polymers having a melting point exceeding 100° C., preferably 150° C. or higher. The insulation layer 3 may not contain the low melting point polymer at all, but preferably contains 1% or more of the low melting point polymer in the low melting point component ratio in terms of ensuring a certain degree of flexibility and extrusion moldability. Thermoplastic elastomers such as acid modified hydrogenated styrene-based thermoplastic elastomers (SEBS), acid modified polyolefins such as acid modified polypropylenes and acid modified polyethylenes and ethylene-based copolymers such as ethylene-ethyl acrylate copolymers (EEA), ethylene-methyl acrylate copolymers (EMA) and ethylene-vinyl acetate copolymers (EVA) can be cited as low melting point polymers, which can be contained in the insulation layer 3.

The insulation layer 3 may contain additives as appropriate in addition to the organic polymers. Flame retardants such as metal hydroxides, copper inhibitors, hindered phenol-based and sulfur-based antioxidants, metal oxides such as zinc oxide can be illustrated as the additives. However, it is better for the insulation layer 3 not to contain additives made of a magnetic material such as those contained in the magnetic sheath layer 7.

The insulation layer 3 may have any tensile modulus of elasticity as an absolute value as long as the total material thereof has a higher tensile modulus of elasticity than the magnetic sheath layer 7, but the tensile modulus of elasticity of the insulation layer 3 is preferably 1600 MPa or more, further 1695 MPa or more in terms of making the tensile modulus of elasticity of the magnetic sheath layer 7 relatively low and avoiding the damage of the metal foil 5 associated with the bending by limiting the bending of the core wire 4 to a certain extent. On the other hand, the tensile modulus of elasticity of the insulation layer 3 is preferably 2500 MPa or less in terms of ensuring sufficient flexibility also in the insulation layer 3. The three-point bending force of the insulation layer 3 is preferably 2.0 N or more at 23° C. and 0.8 N or more at 150° C. in terms of easily satisfying the relationship 3 and limiting the bending of the core wire 4 to a certain extent at normal and room temperatures. On the other hand, the three-point bending force of the insulation layer 3 is preferably 3.3 N or less at 23° C. and 2.0 N or less at 150° C. in terms of ensuring the flexibility of the insulation layer 3. A thickness of the insulation layer 3 is not particularly limited, but a range of 0.1 mm or more and 1.0 mm or less can be illustrated as a thickness range.

(Metal Foil)

The metal foil 5 is constituted as a thin film of a metal material. The metal foil 5 shields noise intruding into the core wire 4 or noise emitted from the core wire 4. The type of metal for constituting the metal foil 5 is not particularly limited and copper, copper alloy, aluminum, aluminum alloy and the like can be illustrated. The metal foil 5 may be composed of a single type of metal or may be formed by laminating layers of two or more types of metals. Further, besides being in the form of an independent metal thin film, the metal foil 5 may be bonded to a base material such as a polymer film of polyethylene terephthalate (PET) or the like by deposition, plating, adhesion or the like. If the metal foil 5 includes the base material, the strength of the metal foil 5 is improved and the damage of the metal foil 5 during bending is less likely to occur by the contribution of the base material. On the other hand, if the metal foil 5 is constituted as an independent metal thin film, an effect of reducing the application of a load to the metal foil 5 when the communication cable 1 is bent by specifying characteristics and composition of the magnetic sheath layer 7 is relatively high. In terms of enhancing noise shielding performance, the metal foil 5 is preferably arranged longitudinally with respect to the core wire 4. In terms of enhancing noise shielding performance, a thickness of the metal foil 5 is preferably 1 μm or more. On the other hand, in terms of making the metal foil 5 easily bent and deformed, following the bending of the communication cable 1, when the communication cable 1 is bent and obtaining a high effect of suppressing the damage of the metal foil 5 by the selection of the materials of the insulation layer 3 and the magnetic sheath layer 7, the thickness of the metal foil 5 is preferably 40 μm or less.

(Braided Layer)

The braided layer 6 is constituted as a braided body formed into a hollow cylindrical shape by braiding a plurality of metal strands with each other. The braided layer 6 functions as an outer conductor and functions to shield noise intruding into the core wire 4 and noise emitted from the core wire 4 together with the metal foil 5. Metal materials such as copper, copper alloy, aluminum and aluminum alloy or those obtained by plating tin or the like to the surfaces of those metal materials can be illustrated as a material of the metal strands constituting the braided layer 6.

The metal foil 5 and the braided layer 6 may be composed of a plurality of layers and other layers may be provided between the metal foil 5 and the braided layer 6 or inside and outside those layers. However, as described later, in the communication cable 1 according to this embodiment, the application of a load from the magnetic sheath layer 7 to the metal foil 5 via the braided layer 6, which possibly occurs when the communication cable 1 is bent, is reduced by specifying the characteristics and composition of the magnetic sheath layer 7. In terms of enhancing that effect, the braided layer 6 and the metal foil 5, and the braided layer 6 and the magnetic sheath layer 7 are preferably directly in contact without any member interposed therebetween. Note that the braided layer 6 is not essentially provided in the communication cable 1, but a load applied to the metal foil 5 from outside when the communication cable 1 is bent increases by providing the braided layer made of the metal material inside the magnetic sheath layer 7 as compared to the case where the braided layer is not provided. Thus, by using the magnetic sheath layer 7 with high flexibility as described later, the effect of reducing the application of a load to the metal foil 5 is larger in the case where the braided layer 6 is provided.

(Magnetic Sheath Layer)

The magnetic sheath layer 7 covers the outer periphery of the core wire 4 via the metal foil 5 and the braided layer 6. The magnetic sheath layer 7 is not bonded to the braided layer 6 and is deformed independently of the braided layer 6 (see FIG. 2) when the communication cable 1 is bent.

The magnetic sheath layer 7 containing a powdered magnetic material and an organic polymer. A powder of the magnetic material is dispersed in a matrix composed of the organic polymer. The magnetic material contained in the magnetic sheath layer 7 is preferably a ferromagnetic material, more preferably a metal or metal compound having soft magnetism. By containing the magnetic material, particularly the soft magnetic material in the magnetic sheath layer 7, an excellent noise shielding effect can be obtained in the communication cable 1. That is, it is possible to suppress a phenomenon in which electromagnetic waves from the outside of the communication cable 1 intrude into the communication cable 1 and affect a signal transmitted in the core wire 4 as noise and a phenomenon in which noise due to a signal transmitted in the core wire 4 is emitted to the outside of the communication cable 1. This is because high-frequency electromagnetic waves, which possibly cause noise, are absorbed and attenuated by magnetic loss in the magnetic material contained in the magnetic sheath layer 7. In the communication cable 1, the noise shielding effect is achieved also by the metal foil 5 and the braided layer 6, but the influence of noise tends to be serious in the case of using the communication cable 1 in communication in a high frequency region such as the one of 1 GHz or higher and the influence of noise can be effectively reduced by providing the magnetic sheath layer 7 together with the metal foil 5 and the braided layer 6.

Irons (pure iron or irons containing a small amount of carbon), silicon steels, magnetic stainless steels such as Fe—Si—Al alloys (sendusts), Fe—Cr—Al—Si alloys and Fe—Cr—Si alloys, Fe—Ni-based alloys (permalloys), ferrites and the like can be illustrated as a soft magnetic material showing high noise shielding performance in a high frequency region. Out of these materials, the use of an Fe—Si—Al alloy or ferrite is particularly preferable in terms of especially excellent noise shielding performance An Ni—Zn-based ferrite can be particularly suitably used as the ferrite. One type of magnetic material may be used or two or more types of magnetic materials may be used in combination through mixing or the like.

A content of the magnetic material in the magnetic sheath layer 7 is not particularly limited, but is preferably 200 parts by mass or more based on 100 parts by mass of the total organic polymer components. On the other hand, the content of the magnetic material is preferably 800 parts by mass or less in terms of ensuring characteristics exhibited by the organic polymer such as flexibility in the magnetic sheath layer 7.

In the magnetic sheath layer 7, the type of the organic polymer used is not particularly limited as long as the relationships 1 and 2 are satisfied between the magnetic sheath layer 7 and the insulation layer 3. For example, olefin-based polymers such as polyolefins and olefin-based copolymers, halogen-based polymers such as polyvinyl chlorides, various engineering plastics, elastomers, rubbers and the like can be used. One type of organic polymer may be used or two or more types of organic polymers may be used in combination through mixing, lamination or the like. As described later, it is particularly preferable to mix and use an organic polymer having a melting point of 100° C. or lower and an organic polymer having a melting point exceeding 100° C. The organic polymer may be cross-linked or foamed.

The magnetic sheath layer 7 contains more low melting point polymer having a melting point of 100° C. or lower than the insulation layer 3 as specified in the relationship 2. Various thermoplastic polymers such as olefin-based thermoplastic resins and styrene-based elastomers including SEBS can be suitably used as the low melting point polymer contained in the magnetic sheath layer 7. Polyolefins such as polyethylenes, acid modified polyolefins such as acid modified polypropylenes and acid modified polyethylenes, copolymers of ethylene and polar monomer such as ethylene-ethyl acrylate copolymers (EEA), ethylene-methyl acrylate copolymers (EMA), ethylene-methyl methacrylate copolymers (EMMA), ethylene-vinyl acetate copolymers (EVA) and ethylene-butyl acetate copolymers (EBA), polyamide copolymers and the like can be cited as the olefin-based thermoplastic resin, which can be particularly suitably used. Above all, the copolymer of ethylene and polar monomer is suitably used as the organic polymer for constituting the magnetic sheath layer 7 in showing a high affinity with the magnetic material by having polarity in addition to having a low melting point. Due to the high affinity between the polymer component and the magnetic material, the flexibility and mechanical strength of the magnetic sheath layer 7 are improved. Preferably, the melting point of the low melting point polymer is 90° C. or lower. One type of low melting point polymer may be used or two or more types of low melting point polymers may be used in combination. A melting point of an organic polymer can be measured by differential scanning colorimetry (DSC).

A composition containing organic polymers tends to become flexible and reduce a tensile modulus of elasticity by containing a large amount of organic polymers having a low melting point. Thus, the magnetic sheath layer 7 containing a large amount of the low melting point polymer tends not only to satisfy the relationship 2 specifying the content of the low melting point polymer itself with the insulation layer 3, but also to satisfy the relationship 1 specifying the tensile modulus of elasticity. The magnetic sheath layer 7 has higher flexibility as a large amount of the low melting point polymer is contained, but preferably contains a high melting point polymer having a melting point exceeding 100° C. in addition to the low melting point polymer having a melting point of 100° C. or lower. By containing the high melting point polymer, thermal deformation resistance can be ensured in the magnetic sheath layer 7. That is, the deformation of the magnetic sheath layer 7 in a high-temperature environment can be suppressed.

The low melting point component ratio in the magnetic sheath layer 7 is preferably 15% or more, further 25% or more. Then, the magnetic sheath layer 7 tends to show high flexibility in normal-temperature and high-temperature environments. On the other hand, the content of the low melting point polymer in the magnetic sheath layer 7 is preferably less than that of the high melting point polymer. That is, the low melting point component ratio is preferably less than 50%. More preferably, the low melting point component ratio is 45% or less, further 40% or less. Then, high thermal deformation resistance is obtained. Polyolefins such as block PP can be illustrated as the high melting point polymer. Preferably, the high melting point polymer has a melting point of 130° C. or higher. One type of high melting point polymer may be used or two or more types of high melting point polymers may be used in combination.

The magnetic sheath layer 7 preferably contains an organic polymer adhesive to the outer sheath layer 8. That enhances close contact between the magnetic sheath layer 7 and the outer sheath layer 8. Then, when the damage of the magnetic sheath layer such as a crack or breakage as described in a section relating to the outer sheath layer 8 later occurs, an effect of suppressing a progress of that damage is enhanced by the presence of the outer sheath layer 8. This is because, even if the magnetic sheath layer 7 is damaged such as by being cracked, each part of the magnetic sheath layer 7 around that damage is kept adhered to the outer sheath layer 8, whereby the collapse of the structure of the magnetic sheath layer 7 hardly proceeds. For example, if the outer sheath layer 8 contains an olefin-based polymer as a main component, an acid modified polyolefin can be suitably used as an adhesive component contained in the magnetic sheath layer 7. Further, if the outer sheath layer 8 contains a halogen-based polymer such as a polyvinyl chloride as a main component, a polyamide can be suitably used as an adhesive component contained in the magnetic sheath layer 7. The low melting point polymer may be used also as the adhesive component. The acid modified polyolefins and polyamides can be used as the low melting point polymers and adhesive components as just described.

The magnetic sheath layer 7 may contain additives as appropriate in addition to the magnetic material and organic polymers. Flame retardants, copper inhibitors, antioxidants, metal oxides and the like can be illustrated as the additives.

As the total material containing the organic polymers and the magnetic material, the magnetic sheath layer 7 has a lower tensile modulus of elasticity than the insulation layer 3 as specified in the relationship 1. The magnetic sheath layer 7 may have any tensile modulus of elasticity as an absolute value, but the tensile modulus of elasticity thereof is preferably 1500 MPa or less, further 1000 MPa or less in terms of sufficiently enhancing the flexibility of the magnetic sheath layer 7. On the other hand, the tensile modulus of elasticity of the magnetic sheath layer 7 is preferably 200 MPa or more, further 500 MPa or more in terms of ensuring the material strength of the magnetic sheath layer 7 and the like. The tensile modulus of elasticity of the magnetic sheath layer 7 can be adjusted by the types of the organic polymers used, the content of the magnetic material and the like.

Further, the magnetic sheath layer 7 preferably satisfies the relationship 3 with the insulation layer 3 as a whole. That is, the flexibility evaluated by the three-point bending test is higher in the magnetic sheath layer 7 than in the insulation layer 3. In other words, values obtained for the magnetic sheath layer 7 as three-point bending forces measured by the three-point bending test at both 23° C. and 150° C. are preferably equal to or less than values obtained for the insulation layer 3. The magnitudes of the three-point bending forces of the magnetic sheath layer 7 themselves are preferably 2.0 N or less, further 1.5 N or less at 23° C. and 1.0 N or less, further 0.5 N or less at 150° C. in terms of easily satisfying the relationship 3 and ensuring sufficient flexibility from a normal temperature to a high temperature in the magnetic sheath layer 7. On the other hand, the three-point bending forces of the magnetic sheath layer 7 are preferably 0.2 N or more at 23° C. and 0.1 N or more at 150° C. in terms of easily ensuring the material strength of the magnetic sheath layer 7. The magnitudes of the three-point bending force of the magnetic sheath layer 7 can be adjusted by the types of the organic polymers used, the content of the magnetic material and the like.

A thickness of the magnetic sheath layer 7 is preferably 0.1 mm or more in terms of enhancing the noise shielding effect and the like. On the other hand, that thickness is preferably 0.5 mm or less in terms of easily following the bending of the core wire 4. A plurality of types of layers may be laminated as the magnetic sheath layer 7 by making the types and amounts of the organic polymers and magnetic material contained. In that case, it is assumed that each layer satisfies the relationships 1 and 2 singly or collectively.

(Outer Sheath Layer)

The outer sheath layer 8 is a layer provided to cover the outer periphery of the magnetic sheath layer 7, and exposed on the outer periphery of the entire communication cable 1. The outer sheath layer 8 contains no magnetic material except unavoidable impurities.

The outer sheath layer 8 may be omitted, but functions to physically protect the magnetic sheath layer 7 and each constituent member inside from contact with external objects and the like. Further, by containing the magnetic material, the hardness of the magnetic sheath layer 7 may increase and a damage such as a crack and breakage may easily occur. However, by covering the magnetic sheath layer 7 with the outer sheath layer 8, it can be suppressed that the damage progresses to form a large gap even if the magnetic sheath layer 7 is damaged such as by being cracked or broken. Then, a situation where a gap is formed in the surface of the magnetic sheath layer 7 by the progress of the damage and the noise shielding performance of the magnetic sheath layer 7 is reduced due to the leakage of electromagnetic waves via that gap is less likely to occur.

The outer sheath layer 8 preferably contains an organic polymer. Similarly to the organic polymer constituting the magnetic sheath layer 7, olefin-based polymers such as polyolefins and olefin-based copolymers, halogen-based polymers such as polyvinyl chlorides, various engineering plastics, elastomers, rubbers and the like can be cited as specific organic polymers. Among all, an elastomer having a relatively high melting point such as an olefin-based thermoplastic elastomer is preferably used in terms of excellent flexibility and adhesiveness to the magnetic sheath layer 7. One type of organic polymer may be used or two or more types of organic polymers may be used in combination through mixing, lamination or the like. The organic polymer may be cross-linked or foamed.

The outer sheath layer 8 preferably has a smaller low melting point component ratio than the magnetic sheath layer 7, similarly to the insulation layer 3. Since the outer sheath layer 8 does not contain a large amount of the low melting point polymer, high heat resistance can be ensured in the outer sheath layer 8. Further, the magnetic sheath layer 7 can be relatively easily made to show high flexibility even at high temperature. On the other hand, in terms of not hindering the flexibility of the magnetic sheath layer 7, the outer sheath layer 8 preferably has a larger low melting point component ratio than the insulation layer 3. In terms of those, the amount of the low melting point component in the outer sheath layer 8 is preferably 5% or more and 20% or less. Polymer components other than the low melting point polymer contained in the outer sheath layer 8 may be high melting point polymers having a melting point exceeding 100° C. and further 150° C. or higher. Similarly to the insulation layer 3, thermoplastic elastomers such as acid modified hydrogenated styrene-based thermoplastic elastomers (SEBS), acid modified polyolefins such as acid modified polypropylenes and acid modified polyethylenes, and ethylene-based copolymers such as ethylene-ethyl acrylate copolymers (EEA), ethylene-methyl acrylate copolymers (EMA) and ethylene-vinyl acetate copolymers (EVA) can be illustrated as the low melting point polymer contained in the outer sheath layer 8.

The outer sheath layer 8 may contain additives as appropriate in addition to the organic polymers. Flame retardants such as metal hydroxides, copper inhibitors, hindered phenol-based and sulfur-based antioxidants, metal oxides such as zinc oxide can be illustrated as the additives.

As the total constituent material, the outer sheath layer 8 preferably has a lower tensile modulus of elasticity than the constituent material of the magnetic sheath layer 7. Then, the outer sheath layer 8 has high flexibility, thereby hardly hindering the flexibility of the magnetic sheath layer 7. A modulus of elasticity of an entire composite of the magnetic sheath layer 7 and the outer sheath layer 8 is preferably 1000

MPa or less. Further, flexibility evaluated by the three-point bending test for the entire composite of the magnetic sheath layer 7 and the outer sheath layer 8 is preferably higher than the insulation layer 3 at least at 150° C. Then, the magnetic sheath layer 7 can be flexibly bent and deformed, accompanied by the outer sheath layer 8, and a load to the metal foil associated with the bending is easily suppressed to be small in a high-temperature environment.

A thickness of the outer sheath layer 8 is not particularly limited, but is preferably 0.1 mm or more in terms of enhancing protection performance for the magnetic sheath layer 7 and the like. On the other hand, the thickness of the outer sheath layer 8 is preferably 1.0 mm or less in terms of easily enhancing the flexibility and the like.

(Bending of Communication Cable and Damage of Metal Foil)

In the communication cable 1 according to this embodiment, the insulation layer 3 and the magnetic sheath layer 7 satisfy the relationships 1 and 2, whereby the metal foil 5 is hardly damaged when the communication cable 1 is bent in normal-temperature and high-temperature environments.

Figure 2:
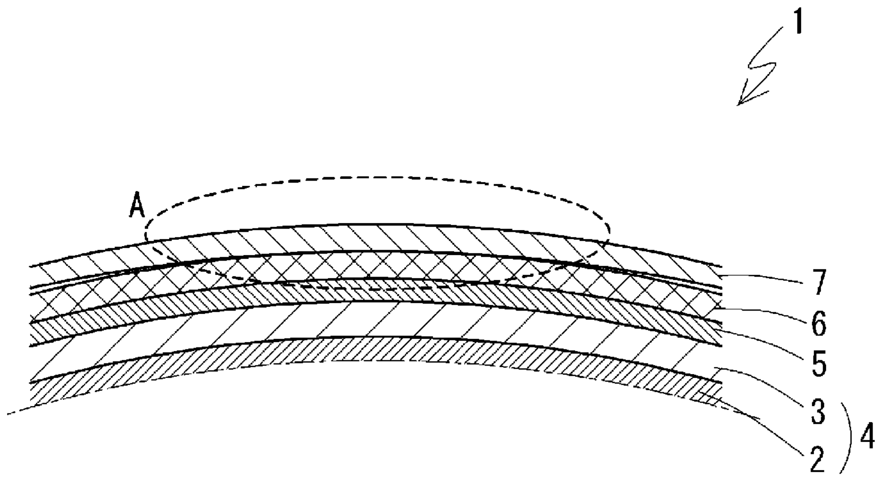
FIG. 2 is a section along the axial direction showing a bent state of the communication cable according to the embodiment of the present disclosure including a magnetic sheath layer with high flexibility, only a region outside a central part of a conductor being shown in FIG. 2 and next FIG. 3 with an outer sheath layer omitted.
Figure 3:
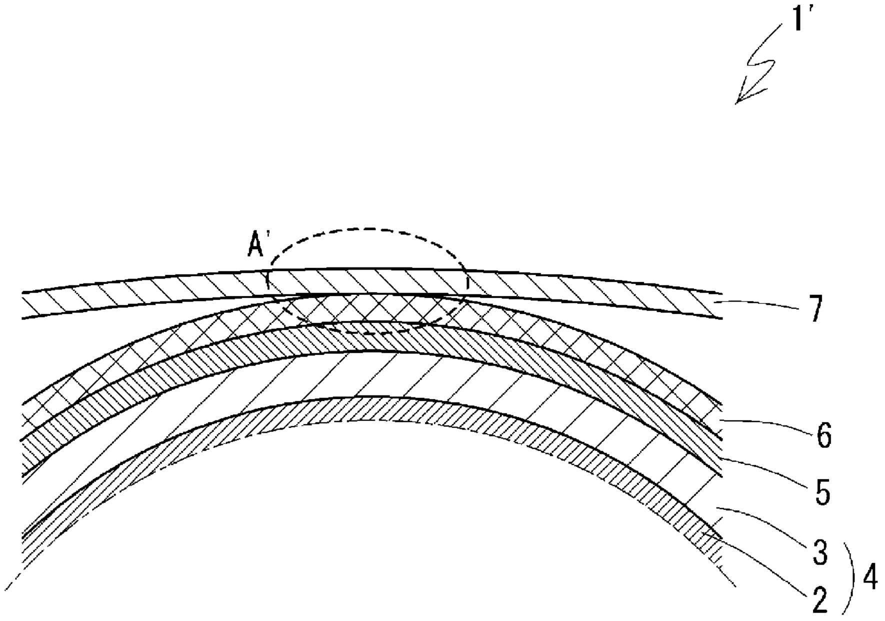
FIG. 3 is a section along the axial direction showing a bent state of a conventional general communication cable including a magnetic sheath layer with low flexibility.

FIG. 3 schematically shows a bent state of the conventionally general communication cable 1', in which the flexibility of the magnetic sheath layer 7 is lower than that of the insulation layer 3, along the axial direction. In FIG. 3 and FIG. 2 to be described next, only a region outside of the bending from the vicinity of a central part of the conductor 2 is shown. Further, the outer sheath layer 8 is omitted. Generally, an organic polymer shows high flexibility, but the flexibility of the total material may be reduced by the addition of an inorganic material such as a magnetic material to the organic polymer. Thus, in the communication cable 1', the flexibility of the magnetic sheath layer 7 containing the magnetic material tends to be lower than that of the insulation layer 3 containing no magnetic material. If the communication cable 1' including the magnetic sheath layer 7 with low flexibility is bent along the axial direction in this way, the core wire 4 is flexibly bent and deformed since the organic polymer of the insulation layer 3 has high flexibility as shown in FIG. 3. The metal foil 5 and the braided layer 6 structured by braiding metal thin wires, both of which have a thin film structure, flexibly follow the deformation of the core wire 4. However, due to low flexibility, the magnetic sheath layer 7 cannot follow the bending of the entire communication cable 1' and the bending of the core wire 4, and comes to have a bent state having a larger radius of curvature than each layer inside.

Then, as indicated by the ellipse in FIG. 3, the braided layer 6 contacts the inner peripheral surface of the magnetic sheath layer 7 at the contact part A' having a small area at the outside of the bending. In this contact part A', a dynamic load is applied inward from the magnetic sheath layer 7. This dynamic load is applied to the metal foil 5 via the braided layer 6, and the metal foil 5 is sandwiched between the braided layer 6 and the core wire 4. Since the metal foil 5 is constituted by a metal thin film, the metal foil 5 is inferior in bending resistance than each layer 3, 7, 8 and the braided layer 6 containing the organic polymers and is easily damaged such as by being broken. Thus, if the metal foil 5 is subjected to pressure and friction in a state where a large load is applied to the metal foil 5 via the magnetic sheath layer 7 and the braided layer 6 and the metal foil 5 is sandwiched between the magnetic sheath layer 7 and the core wire 4, there is a possibility that the metal foil 5 is damaged such as by being broken. If the load is concentrated in the contact part A' having a small area as shown in FIG. 3, there is a high possibility of damaging the metal foil 5. If the metal foil 5 is damaged such as by being broken or cracked, it leads to a reduction in the noise shielding performance of the communication cable 1'.

However, in the communication cable 1 according to this embodiment, the tensile modulus of elasticity of the magnetic sheath layer 7 is lower than that of the insulation layer 3 as specified by the relationship 1. That is, the magnetic sheath layer 7 s higher flexibility than the insulation layer 3. Then, as shown in FIG. 2, flexible bending of the core wire 4 including the insulation layer 3 is limited due to a high tensile modulus of elasticity of the insulation layer 3 and bending at a small radius of curvature hardly occurs when the communication cable 1 is bent along the axial direction. On the other hand, the magnetic sheath layer 7 can be bent, following the bending of the core wire 4, the metal foil 5 and the braided layer 6, by having high flexibility. Then, as indicated by an ellipse in FIG. 2, the entire communication cable 1 is bent with the braided layer 6 kept in contact with the inner peripheral surface of the magnetic sheath layer 7 in a contact part A having a large area. In this case, a dynamic load applied from the magnetic sheath layer 7 to the metal foil 5 via the braided layer 6 is dispersed in the contact part A having a large area and the load applied to each part of the metal foil 5 is suppressed to be small. Then, the metal foil 5 is less likely to be damaged such as by being cracked or broken, and the noise shielding effect exhibited by the metal foil 5 is maintained high even after the bending of the communication cable 1.

Further, in the communication cable 1 according to this embodiment, not only the relationship 1 specifying the tensile modulus of elasticity at normal temperature is satisfied, but also the low melting point component ratio is larger in the magnetic sheath layer 7 than in the insulation layer 3 as specified in the relationship 2. By satisfying the relationship 2, the damage of the metal foil 5 associated with the bending of the communication cable 1 hardly occurs not only at normal temperature, but also at high temperature. Generally, the flexibility of the organic polymer shows a high temperature response. If the organic polymer is softened due to a high temperature, the flexibility increases, whereas physical properties do not show large temperature dependence at temperatures of about several hundreds of degrees since the magnetic material is formed from metal or metal compound. Thus, in the communication cable 1, the insulation layer 3 containing no magnetic material easily shows flexibility significantly higher than at normal temperature in a high-temperature environment, whereas the flexibility of the magnetic sheath layer 7 hardly increases even at high temperature as compared to normal temperature. That is, even if the magnetic sheath layer 7 shows higher flexibility than the insulation layer 3 at normal temperature, the flexibility of the insulation layer 3 drastically increases, whereas the flexibility of the magnetic sheath layer 7 does not increase very much when a high temperature is reached. Thus, there is a possibility that a flexibility relationship of the both is reversed and the insulation layer 3 shows higher flexibility than the magnetic sheath layer 7. Then, at normal temperature, soft bending of the core wire 4 including the insulation layer 3 is limited, the magnetic sheath layer 7 can be bent, following the core wire 4, as shown in FIG. 2. Even if the damage of the metal foil 5 associated with the bending can be avoided, the core wire 4 including the insulation layer 3 is flexibly bent, whereas the magnetic sheath layer 7 cannot follow the bending of the core wire 4 as shown in FIG. 3 when a high temperature is reached, wherefore the metal foil 5 is easily damaged.

In contrast, in the communication cable 1 according to this embodiment, since the low melting point component ratio is larger in the magnetic sheath layer 7 than in the insulation layer 3 as specified by the relationship 2, the magnetic sheath layer 7 is easily softened from a lower temperature than the insulation layer 3 when being heated. This is because the organic polymer having a low melting point or a composition having a high content ratio of the polymer having a low melting point is softened even at a low heating temperature. Since the flexibility due to softening increases in the magnetic sheath layer 7 from a lower heating temperature than the insulation layer 3, a flexibility level of the magnetic sheath layer 7 obtained by a low tensile modulus of elasticity (relationship 1) is kept without being reversed by the insulation layer 3 even at high temperature. Then, even when the communication cable 1 is bent in a high-temperature environment, the magnetic sheath layer 7 can be flexibly bent, following the core wire 4, the metal foil 5 and the braided layer 6, as in FIG. 2 as in the case of normal temperature. As a result, a situation where the metal foil 5 is damaged by the application of a large load associated with the bending is easily avoided even in the high-temperature environment.

As in the normal-temperature environment, even in the high-temperature environment, an improvement in the bending resistance of the communication cable 1 under the high-temperature environment is more effectively achieved when not only the relationship of the low melting point component ratio of the relationship 2 is satisfied, but also the relationship 3 is satisfied, i.e. the flexibility evaluated by the three-point bending test is higher in the magnetic sheath layer 7 than in the insulation layer 3 at both 23° C. and 150° C. As the low melting point component ratio in the magnetic sheath layer 7 is increased in accordance with the relationship 2, the relationship 3 is more easily satisfied and the flexibility of the magnetic sheath layer 7 at high temperature is increased. Thus, bending followability is improved. On the other hand, if the content of the low melting point component is suppressed to be less than that of the high melting point component, thermal deformation resistance can also be ensured in addition to flexibility at high temperature in the magnetic sheath layer 7.

As described above, in the communication cable 1 according to this embodiment, the magnetic sheath layer 7 have predetermined characteristics in comparison to the insulation layer 3, whereby high flexibility is shown at normal temperature and high temperature. Thus, when the communication cable 1 is bent in the normal-temperature and high-temperature environments, the occurrence of damage of the metal foil 5 such as a crack or breakage due to a large load applied from the magnetic sheath layer 7 to a specific part of the metal foil 5 via the braided layer 6 is suppressed. As a result, the noise shielding performance obtained by the metal foil 5 is maintained high. The communication cable 1 according to this embodiment can be suitably used for high-speed communication applications in an environment frequently subjected to bending due to flexure and vibration and easily exposed to a high temperature such as automotive vehicles.

Note that, although a load reducing effect by improving the flexibility of the magnetic sheath layer 7 largely appears since a large load is applied to the metal foil 5 sandwiched between the core wire 4 and the magnetic sheath layer 7 during bending in the communication cable 1 described above having a coaxial structure, the structure of the communication cable is not limited to the coaxial one. If the metal foil 5 is provided to cover the outer periphery of the core wire responsible for communication and the magnetic sheath layer 7 is appropriately provided on the outer periphery of the metal foil 5 via the braided layer 6, any communication cable may be used. Twisted pair cables and parallel pair cables provided with a core wire including a pair of insulated wires can be illustrated as communication cables other than coaxial cables.

EXAMPLES

Examples are described below. Note that the present invention is not limited by these examples.

Fabrication of Communication Cable

A core wire was formed by forming an insulation layer on the outer periphery of a conductor constituted as a stranded wire of copper alloy by extrusion molding. A material obtained by mixing respective components shown under "Insulation Layer" in Table 1 below was used as a constituent material of the insulation layer. A conductor cross-sectional area was 0.18 $mm^2$ and a thickness of the insulation layer was 0.54 mm.

A copper foil (thickness of 25 μm; obtained by bonding a copper thin film having a thickness of 9 mm and a PET film having a thickness of 16 μm by an adhesive layer having a thickness of 1 μm or less) was longitudinally arranged as a metal foil on the outer periphery of the core wire. Further, a braided layer was formed on the outer periphery of the copper foil. The braided layer was constituted as a single braid formed of tin plated soft copper wires (TA wires).

A magnetic sheath layer was formed on the outer periphery of the braided layer. The magnetic sheath layer was formed to have a thickness of 0.20 mm by extrusion molding a mixture of organic polymers and a magnetic material powder shown in Table 2 below in each of Samples #1 to #9. Further, for each sample, an outer sheath layer was formed on the outer periphery of the magnetic sheath layer by extrusion molding, whereby a communication cable was completed. A thickness of the outer sheath layer was 0.20 mm. A mixture of respective components shown under "Outer Sheath Layer" in Table 1 below was used as a constituent material of the outer sheath layer for any of the samples.

The followings were used as the respective components for constituting the insulation layer, the magnetic sheath layer and the outer sheath layer.

(Organic Polymers)

Block PP1: Block PP "Novatec BCO6C" produced by Japan Polypropylene Corporation

Block PP2: Block PP "Novatec EC9GD" produced by Japan Polypropylene Corporation

Homo PP: "Novatec EA9FTD" produced by Japan Polypropylene Corporation

TPO1: TPO "Adflex Q200F" produced by LyondellBasell

TPO2: TPO "Santoprene 203-40" produced by Exxon Mobil Corporation

TPO3: TPO "Welnex RMG02" produced by Japan Polypropylene Corporation

EEA: "NUC 6940" produced by NUC Corporation

Acid modified SEBS: "Tuftec M1913" produced by Asahi Kasei Corporation (Magnetic Materials)

Fe—Si—Al alloy: "FME3D-AH" produced by Sanyo Special Steel Co., Ltd.

Ni—Zn ferrite: "KNI-109" produced by JFE Chemical Corporation (Other Additives)

Copper inhibitor: "CDA-1" produced by ADEKA Corporation

Hindered phenol-based antioxidant: "Irganox 1010FF" produced by BASF

Sulfur-based antioxidant: "Antage MB" (2-Mercaptobenzimidazole) produced by Kawaguchi Chemical Industry Co., Ltd.

Zinc oxide: "Zinc oxide #2" produced by Hakusui Tech.

Flame retardant: "Kisuma 5" (magnesium hydroxide) produced by Kyowa Chemical Industry Co., Ltd.

Evaluations (1) Tensile Modulus of Elasticity

The tensile modulus of elasticity of the constituent material of each of the insulation layer, the magnetic sheath layer and the outer sheath layer was measured. The measurement was conducted at normal temperature in the atmosphere by the tensile test based on JIS K 7161. A measurement sample used was obtained by pulling and removing members inward of a measurement target layer for a cable at a stage when formation up to the measurement target layer was completed while the communication cable was being formed as described above. That is, a sample obtained by removing the conductor from the core wire was used in the measurement for the insulation layer. A sample obtained by removing the core wire, the metal foil and the braided layer inside from the wire formed up to the magnetic sheath layer was used in the measurement for the magnetic sheath layer. A sample obtained by removing the core wire, the metal foil and the braided layer inside from the wire formed up to the outer sheath layer was used in the measurement for the outer sheath layer. Since the outer sheath layer adheres to the magnetic sheath layer and it is difficult to separate the both, the measurement for the outer sheath layer was conducted for a composite with the magnetic sheath layer. Thus, a measurement result of the tensile modulus of elasticity includes a contribution of the magnetic sheath layer.

(2) Three-Point Bending Force

Three-point bending forces were measured for the constituent material of each of the insulation layer, the magnetic sheath layer and the outer sheath layer by the bending characteristic test based on JIS K 7171. Similarly to the above evaluations of the tensile modulus of elasticity, samples obtained by removing constituent members inward of a target layer were also used for the evaluation of the three-point bending forces. Similarly to the above evaluations of the tensile modulus of elasticity, the evaluation for the outer sheath layer was conducted for a composite with the magnetic sheath layer. In measuring, each sample was cut to a length of 80 mm and a maximum bending stress (unit: N) when a central part of the sample was bent with both ends supported was measured and set as the three-point bending force. Each measurement was conducted in an environment at normal temperature (23° C.) and 150° C. in the atmosphere.

(3) Bending Resistance

Bending resistance was evaluated for the communication cable (formed up to the outer sheath layer) of each sample. Specifically, a bending operation of bending each communication cable at the same position with a bending diameter (R) of 50 mm, at a bending angle of 90° and at a bending rate of 5 times/sec was performed 100 times. Thereafter, the communication cable is disassembled at the bent position and the metal foil was visually observed. The bending resistance of the communication cable in which the metal foil was not damaged at all was particularly evaluated as "A+", the bending resistance of the communication cable in which a sign of pressure observed as a dent was seen in the metal foil was evaluated as "A" having high bending resistance. On the other hand, the communication cable in which the metal foil was broken was evaluated as "B" having low bending resistance. The bending operation was performed in each of normal temperature (23° C.) and 150° C. environments in the atmosphere. Note that, even if the metal foil is damaged to have a dent-like sign of pressure, it hardly affects the noise shielding performance of the communication cable.

(4) Thermal Deformation Resistance

A load of 100 g was continuously applied to a region over a length of 0.7 mm of the communication cable (formed up to the outer sheath layer) according to each sample from a lateral side by a blade (metal piece) having a weight placed thereon at 85° C. for 5 hours. In an initial state before heating and load application and a state after heating and load application (after heating), an outer diameter of the communication cable was measured at a shortest position, a reduction ratio of the outer diameter after heating to the outer diameter in the initial state was recorded and set as a thermal deformation rate. That is, the thermal deformation rate was estimated as follows.

[Thermal deformation rate]=([outer diameter in initial state]−[outer diameter after heating])/[outer diameter in initial state]×100%

The communication cable having a thermal deformation rate below 20% was evaluated as "A" having high thermal deformation resistance. On the other hand, the communication cable having a thermal deformation rate of 20% or more was evaluated as "B" having low thermal deformation resistance.

Results

Table 1 shows component compositions in parts by mass in an upper part and measurement results on the tensile modulus of elasticity and the three-point bending force at each temperature in a lower part for the insulation layer materials and the materials used in fabricating the outer sheath layer of all the samples. Further, for each of Samples #1 to #9, the component composition of the magnetic sheath layer is shown in parts by mass in an upper part and each evaluation result is shown in a lower part in Table 2. For each polymer component, the values of the melting point measured by DSC and the tensile modulus of elasticity are also shown in Tables 1 and 2. Note that, in Tables 1 and 2, the content of each component is indicated based on 100 parts by mass of a total amount of the organic polymers, and a ratio (unit: %) of the individual organic polymer to the total organic polymers such as a low component ratio corresponds to a numerical value of the indicated parts by mass itself.

TABLE 1

| Component Composition | Melting Point [° C.] | Tensile Modulus of Elasticity [MPa] | Insulation Layer | Outer Sheath Layer |
|---|---|---|---|---|
| TPO1 | 167.6 | 150 | — | 60.0 |
| TPO2 | 157.3 | 240 | — | 30.0 |
| Block PP2 | 162.3 | 1100 | 50.0 | — |
| Home PP | 162.3 | 2300 | 48.0 | — |
| Acid Modified SEBS | 54.6 | — | 2.0 | 10.0 |

TABLE 1-continued

| Component Composition | Melting Point [° C.] | Tensile Modulus of Elasticity [MPa] | Insulation Layer | Outer Sheath Layer |
|---|---|---|---|---|
| Copper Inhibitor | — | — | 0.5 | — |
| Hindered Phenol-based Antioxidant | — | — | 1.2 | 2.0 |
| Sulfur-based Antioxidant | — | — | 0.8 | — |
| Zinc Oxide | — | — | 0.8 | — |
| Flame Regardant | — | — | 0.8 | 120.0 |
| Tensile Modulus of Elasticity [MPa] | | | 1695 | 409 |
| Three-Point Bending Force [N] | | 23° C. | 1.8 | 2.2 |
| | | 150° C. | 0.86 | 0.51 |

Samples #1 to #3 contain only TPO3 having a lower tensile modulus of elasticity as the olefin-based polymer, and Sample #9 contains only block PP1 having a high tensile modulus of elasticity as the olefin-based polymer. Samples #4 to #8 contain those two types of olefin-based polymers. Among all, Samples #4, #6 to #8 have an equal content of block PP1 having a high tensile modulus of elasticity. However, the obtained bending resistance evaluation results are highly correlated to the relationship between the tensile modulus of elasticity and the low melting point component ratio in the magnetic sheath layer and the insulation layer as described above, beyond the presence or absence of the two types of olefin-based polymers, which are both high melting point polymers having a melting point exceeding 100° C., and a difference in content ratio. Thus, in avoiding the damage of the metal foil associated with the bending at normal temperature and high temperature in the communication cable, two parameters including the tensile modulus of elasticity and the low melting point component ratio are focused, and it can be said to be a good guide to set a lower tensile modulus of elasticity and a larger low melting point component ratio in the magnetic sheath layer than in the insulation layer, rather than focusing on the tensile modulus of elasticity of the individual polymer component.

TABLE 2

| Magnetic Sheath Layer Component Composition | Melting Point [° C.] | Tensile Modulus of Elasticity [MPa] | #1 | #2 | #3 | #4 | #5 | #6 | #7 | #8 | #9 |
|---|---|---|---|---|---|---|---|---|---|---|---|
| TPO3 | 138.2 | 350 | 30 | 50 | 70 | 45 | 10 | 30 | 60 | 75 | — |
| Block PP1 | 165.5 | 1800 | — | — | — | 25 | 60 | 25 | 25 | 25 | 70 |
| EEA | 85.9 | 7 | 70 | 50 | 30 | 30 | 30 | 45 | 15 | — | 30 |
| Fe—Si—Al Alloy | — | — | 300 | 300 | 300 | 300 | 300 | 300 | 300 | 300 | 300 |
| Ni—Zn Ferrite | — | — | 100 | 100 | 100 | 100 | 100 | 100 | 100 | 100 | 100 |
| Tensile Modulus of Elasticity [MPa] | | | 250 | 663 | 1047 | 1410 | 1917 | 1358 | 1461 | 1513 | 2062 |
| Three-Point Bending Force [N] | | 23° C. | 0.3 | 0.9 | 1.4 | 1.8 | 2.5 | 1.8 | 1.9 | 2.0 | 2.7 |
| | | 150° C. | 0.19 | 0.25 | 0.30 | 0.38 | 1.10 | 0.29 | 1.03 | 1.15 | 1.30 |
| Bending Resistance Evaluation | | 23° C. | A+ | A+ | A+ | A+ | B | A+ | A+ | A+ | B |
| | | 150° C. | A+ | A+ | A+ | A+ | B | A+ | A | B | B |
| Thermal Deformation Resistance Evaluation | | | B | B | A | A | A | A | A | A | A |

According to Table 2, Samples #1 to #4, #6 and #7 satisfy both the relationships 1 and 2. That is, the tensile modulus of elasticity of the magnetic sheath layer is lower than that (1695 MPa) of the insulation layer and the low melting point component ratio in the magnetic sheath layer, i.e. the number of parts by mass of EEA, which is a low melting point polymer having a melting point of 100° C. or lower, is larger than the low melting point component ratio (2%, which is a content ratio of acid modified SEBS) in the insulation layer. In each of these samples, a result indicating high bending resistance (A) or particularly high bending resistance (A+) is obtained at both 23° C. and 150° C. in the bending resistance evaluation.

In contrast to the above, in Samples #5 and #9, the tensile modulus of elasticity of the magnetic sheath layer is higher than that of the insulation layer and the relationship 1 is not satisfied. In these Samples #5 and #9, a result of low bending resistance (B) is obtained at both 23° C. and 150° C. in the bending resistance evaluation. Further, in Sample #8, the magnetic sheath layer does not include EEA, which is the low melting point polymer, the low melting point component ratio is smaller than that of the insulation layer, and the relationship 2 is not satisfied. In this Sample #8, high bending resistance is obtained (A+) at 23° C., but the bending resistance is low (B) at 150° C. in the bending resistance evaluation. As just described, from the comparison of Samples #1 to #4, #6 and #7 and Samples #5, #8 and #9, it is understood that high bending resistance is obtained in the communication cable and the breakage of the metal foil associated with the bending of the communication cable can be prevented at normal temperature and at a high temperature of 150° C. if the tensile modulus of elasticity is lower and the low melting point component ratio is larger in the magnetic sheath layer as compared to the insulation layer.

Further, if the evaluation results of Samples "1 to #4, #6 and #7 satisfying the relationships 1 and 2 are compared to each other, the bending resistance evaluation result at 150° C. is only high (A) in Sample #7, whereas a particularly high evaluation result (A+) is obtained at both 23° C. and 150° C. in the other samples. In Sample #7, the three-point bending force of the magnetic sheath layer is larger than that of the insulation layer at 23° C. and 150° C., whereas the three-point bending force of the magnetic sheath layer is a value equal to or less than the value of the insulation layer at both 23° C. and 150° C. in the samples other than Sample #7. From this, it can be said that flexibility evaluated by the three-point bending force in the magnetic sheath layer is equal to or higher than that in the insulation layer at both 23° C. and 150° C., whereby particularly high bending resistance is obtained at both normal and high temperatures and the damage of the metal foil associated with the bending can be particularly highly suppressed.

Finally, in Samples #1 and #2, high bending resistance is obtained at both 23° C. and 150° C., but the thermal deformation resistance is low (B). In the samples other than Samples #1 and #2, high thermal deformation resistance is obtained. The content of EEA, which is a low melting point polymer, is suppressed to be less than the content (total content of two types) of TPO3 and block PP1, which are high melting point polymers, in the magnetic sheath layer in the samples other than Samples #1 and #2, whereas the content of EEA, which is a low melting point polymer, is more than the content (total content of two types) of TPO3 and block PP1, which are high melting point polymers, in Samples #1 and #2. An improvement in the thermal deformation resistance of the communication cable is not sought in the communication cable according to the present disclosure, but it is understood better to set a larger content ratio (lower melting point component ratio) of the low melting point polymer in the magnetic sheath layer than that of the insulation layer and the content ratio of the high melting point polymers in terms of achieving high thermal deformability by achieving high bending resistance at both normal and high temperatures.

Note that, although the type and content of the magnetic material in the magnetic sheath layer are the same in any of Samples #1 to #9 described above, it is separately confirmed that the magnetic sheath layer shows sufficiently high noise shielding performance by containing that amount of the magnetic material. A radiation emission evaluation based on CISPR25 (standards of "limits and methods for the measurement of radio disturbances for protection of on-board receivers" by Special International Committee for Radio Interference) was conducted as an evaluation for confirmation. Specifically, a communication cable of Sample #1 cut to 1500 mm was used, and a horn antenna was installed at a position laterally separated by 1.0 m from a central part of the communication cable in an anechoic chamber. Then, an electrical signal having a frequency of 1.6 GHz was input to the communication cable, and an amount of noise radiation at this time was measured by the horn antenna. The amount of noise radiation measured for Sample #1 was 5.8 dB (μV/m). Roughly, if the amount of noise radiation is below 16 dB (μV/m), the noise shielding performance of the communication cable can be said to be sufficiently high.

Although the embodiment of the present disclosure has been described in detail above, the present invention is not limited to the above embodiment at all and various changes can be made without departing from the gist of the present invention.

LIST OF REFERENCE NUMERALS

1, 1' communication cable
2 conductor
3 insulation layer
4 core wire
5 metal foil
6 braided layer
7 magnetic sheath layer
8 outer sheath layer
A, A' contact part

What is claimed is:

1. A communication cable, comprising:
a conductor;
an insulation layer containing an organic polymer, the insulation layer covering an outer periphery of the conductor;
a metal foil for covering an outer periphery of the insulation layer; and
a magnetic sheath layer containing an organic polymer and a powdered magnetic material, the magnetic sheath layer covering an outer periphery of the metal foil,
a tensile modulus of elasticity of the magnetic sheath layer being lower than that of the insulation layer, and
assuming that an organic polymer having a melting point of 100° C. or lower is a low melting point polymer and a mass ratio of the low melting point polymer to organic polymer components constituting each layer is a low melting point component ratio, the low melting point component ratio being larger in the magnetic sheath layer than in the insulation layer.

2. The communication cable of claim 1, further comprising a braided layer constituted as a braided body by braiding metal strands, the braided layer covering the outer periphery of the metal foil, wherein:
the magnetic sheath layer covers an outer periphery of the braided layer.

3. The communication cable of claim 1, wherein a content of the low melting point polymer is less than that of a high melting point polymer having a melting point exceeding 100° C. in the magnetic sheath layer.

4. The communication cable of claim 1, wherein the low melting point component ratio is 15% or more and 45% or less in the magnetic sheath layer and 10% or less in the insulation layer.

5. The communication cable of claim 1, wherein the magnetic sheath layer contains a copolymer of an ethylene and a polar monomer as the low melting point polymer.

6. The communication cable of claim 1, wherein flexibility evaluated by a three-point bending test is higher in the magnetic sheath layer than in the insulation layer at both 23° C. and 150°° C.

7. The communication cable of claim 1, wherein the magnetic sheath layer contains 200 parts by mass or more and 800 parts by mass or less of the magnetic material based on 100 parts by mass of the organic polymer components.

8. The communication cable of claim 1, further comprising an outer sheath layer on an outer periphery of the magnetic sheath layer, the outer sheath layer containing an organic polymer and no magnetic material.

9. The communication cable of claim 8, wherein the low melting point component ratio is larger in the magnetic sheath layer than in the outer sheath layer.

10. The communication cable of claim 8, wherein the magnetic sheath layer contains an organic polymer adhesive to the outer sheath layer.

* * * * *